Patented Sept. 30, 1930

1,776,904

UNITED STATES PATENT OFFICE

RAY W. HESS, OF BUFFALO, NEW YORK, ASSIGNOR TO NATIONAL ANILINE & CHEMICAL CO., INC., OF NEW YORK, N. Y., A CORPORATION OF NEW YORK

SULPHURIZED DYESTUFFS AND METHOD OF MAKING THE SAME

No Drawing.  Application filed July 24, 1925.  Serial No. 45,935.

This invention relates to improvements in the manufacture and production of sulphurized dyestuffs derived from indophenols, and particularly sulphurized vat dyestuffs derived from the carbazole-indophenols and their substitution products, especially carbazole-indophenol and N-ethylcarbazole-indophenol. The invention also includes, as new products, certain sulphurized dyestuffs derived from the carbazole-indophenols.

According to the present invention, sulphurized dyestuffs, and particularly sulphurized vat dyestuffs, are economically and efficiently produced by heating, preferably to boiling temperatures, the carbazole-indophenols and their substitution products, or their leuco compounds, with alkali metal polysulfides containing a high percentage of sulphur in the presence of a suitable solvent. While ethyl and methyl alcohol constitute suitable solvents, a suitably denatured alcohol can be employed, for example, ethyl alcohol denatured by the addition of methanol, pyridine, or a liquid hydrocarbon such as benzene (benzol) or benzine (kerosene), or an admixture of two or more of these or similar denaturants. As a rule, the amount of denaturant should not exceed about ten percent, preferably not more than one-half to two percent, by volume of the solvent.

It has also been found that the impure vat dyestuffs obtained directly by the sulphuration of the carbazole-indophenols, or their leuco compounds, with alkali polysulfides in the presence of a suitable solvent can be advantageously purified from superfluous sulphur and from readily soluble impurities or by-products by treating or digesting them with a solution of an alkali metal monosulfide, such as sodium monosulfide, the amount of monosulfide being such that it is substantially all converted into a polysulfide, preferably a polysulfide empirically corresponding in composition to a trisulfide, tetrasulfide or pentasulfide, or a mixture of these sulfides, by the superfluous sulphur present in the dyestuff. Under these conditions the conversion of the vat dyestuff into a dyestuff readily soluble in sodium sulfide is minimized or avoided, a conversion which otherwise takes place to a more or less extent when larger quantities of an alkali metal monosulfide is used in the purification.

It has also been found that caustic alkali, for example caustic soda, can be used in the purification in place of the alkali metal sulfide, and the amount used is preferably such as to permit the formation, besides sodium thiosulfate, of tri-, tetra- or pentasulfide, or a mixture of these sulfides, by its interaction with the free sulphur present.

It has been further found that such sulphurized dyestuffs, and particularly the vat dyestuffs, and whether purified or not, are obtained in the dried state in much better yields if made neutral or slightly acid before drying their pastes or press-cakes. This may be accomplished by treating the paste or press-cake with acidulated water and finally with water before drying. For example, it has been found that a paste or press-cake which shows an alkaline reaction may lose upon drying to substantial dryness as much as 10 to 35 percent, or more, in tinctorial value or power while substantially no or comparatively little loss in tinctorial power occurs if the paste or press-cake is made non-alkaline in reaction, that is, neutral or slightly acid, before drying. The dyestuffs thus obtained are regarded as new products and as forming a part of the present invention. They filter more readily from an acid or neutral medium or solution than from an alkaline one, and are more easily washed.

The following examples will further illustrate the invention, but it will be understood that the invention is not limited thereto. The parts are by weight.

Example 1: 200 parts sodium sulfide of 60 percent, 450 parts flowers of sulphur, and 800 parts denatured alcohol (containing, by volume, 100 parts ethyl alcohol, 10 parts methanol and ½ part benzine as per Formula No. 1, completely denatured alcohol, Appendix, Regulations No. 61, United States Internal Revenue, September, 1922) are heated to boiling with agitation for about 1 to 3 hours under a reflux condenser until substantially no more sulphur is dissolved. It is then cooled to about 50°–60° C., and 100 parts of carbazole-indophenol (obtained, for example, by the condensation of carbazole with para-nitrosophenol in the presence of concentrated sulphuric acid at a temperature below 0° C.), or its leuco compound, are gradually added to the well-stirred solution. The whole is then boiled under a reflux condenser for about 48 to 60 hours or until the sulphuration is complete. The alcohol is then distilled off until the residue is left as a thick paste, and the dyestuff isolated in one of the following ways:

(a) About 1500 parts of warm water are added to the residual paste, the well-stirred mixture is heated to about 75°–90° C., and 200–250 parts of common salt added. After stirring and heating for about 25–35 minutes, it is filtered and the residue washed with an 18° Bé. salt solution until it shows very little, if any, alkaline reaction when tested with brilliant yellow or Congo red paper.

The press-cake thus obtained may be standardized as a paste of any suitable strength, but if it is to be dried it is added to about 1500 parts water, heated to about 40°–50° C. with stirring until complete suspension is obtained, and then just enough hydrochloric, or acetic or sulphuric acid added to give the mixture a neutral or barely acid reaction. It is then filtered, thoroughly washed with water, and dried at a temperature not to exceed 100° C., and preferably at a temperature not to exceed about 65° C. It may be dried at ordinary room temperature; but a temperature of about 50°–65° C. is particularly satisfactory. Diminished or ordinary pressures may be used.

(b) About 1500 parts of water are added to the residual paste, the mixture stirred until most or all of the residue is in suspension, sufficient acid (preferably acetic, hydrochloric or sulphuric acid) added to give the mixture a barely acid reaction, and it is then filtered and washed thoroughly with water. If desired, it may be dried at a temperature below 100° C., preferably at a temperature of about 50°–65° C.

Instead of distilling off the alcohol, the alcoholic mixture at the completion of the sulphuration may be diluted with water and the dyestuff then isolated by the addition of common salt or acidification as described. Or the alcoholic mixture may be filtered and the residue and filtrate treated separately.

The isolated dyestuff thus obtained, whether as moist press-cake or in the dried state, may contain considerable amounts of admixed sulphur as well as certain impurities or by-products, chiefly sulphur dyes soluble in sodium sulfide solutions. If desired, it may be purified by the following method:

(a) The dyestuff, either as moist press-cake or in the dried state, is added to a solution of sodium monosulfide preferably about a 3 to 5 per cent solution, of such an amount that by combining with the superfluous sulphur present in the dyestuff a polysulfide corresponding in composition to sodium trisulfide, tetrasulfide, or pentasulfide, or a mixture of these sulfides, is substantially the only sulfide formed and present in the final solution. The amount of sodium sulfide required can be estimated from the amount of sulphur present by extracting a dried sample of the dyestuff with carbon disulfide. The mixture, with stirring, is heated to about 80°–90° C., for about 10–20 minutes and then filtered, the residue washed first with a little water or a salt solution, then with acidulated water, and finally with water alone until substantially free from soluble matter. The press-cake may be dried, preferably at a temperature of about 50°–65° C. either in a vacuum or at ordinary pressure.

The dyestuff may also be isolated, purified, and dried as hereinafter described under Example 2.

Example 2: 200 parts sodium sulfide of 60 percent and 350 parts powdered sulphur are boiled with agitation under a reflux condenser with 800 parts of special denatured alcohol (containing, by volume, 100 parts ethyl alcohol and ½ part benzol, as per Formula No. 2-B, specially denatured alcohol, Appendix, Regulations No. 61, United States Internal Revenue, September, 1922) for 1 or 2 hours until a highly sulphurized sodium polysulfide is formed. The solution is then cooled to about 40–50° C. and 100 parts N-ethylcarbazole-indophenol (obtained, for example, by condensing N-ethylcarbazole with para-nitrosophenol in the presence of concentrated sulphuric acid below 0° C.), or its leuco compound, are gradually added with stirring. If added too rapidly, or at too high temperature, tarry lumps of the indophenol are apt to form. The well-stirred mixture is then heated to boiling under a reflux condenser for between about 60 to 65 and 100 hours, preferably about 70 to 90 hours, or until the sulphuration is complete. It is necessary that the boiling be continued for a sufficient period of time otherwise the dyestuff will give dull and red dyeings. Moreover, the amount of sodium sulfide soluble dyestuffs, which may be present, decreases to a minimum on continued boiling while the amount of vat dyestuffs increases to a maximum. The sulphuration is substantially complete when this minimum or maximum is reached. The continuation of the boiling after the reaction is ended appears to do no harm. It appears probable that the presence of free sulphur is advantageous during the sulphuration. When the sulphuration is completed the alcohol is distilled off leaving the residue as a thick paste. If the distillation is carried too far the residue will become lumpy and hard to disintegrate. The dyestuff in the residual paste can be isolated, purified, and dried as described under Example 1 or as follows:

(a) About 2000 parts of cold water are added to the residual paste and the mixture stirred until a smooth suspension is obtained. It is then filtered and the residue washed with a small amount of water, insufficient to remove any or very little dye in colloidal condition. That is, the washings will have a clear yellowish-brown color at first but the washings become darker due to the presence of dyestuff as the washing is continued, and at this point the washing with water is discontinued. The press-cake may be standardized to a paste or it may be purified by heating it to boiling with about a 5 percent caustic soda solution containing about 90 parts of caustic soda for each 100 parts free sulphur present in the cake. It is then filtered, and washed with a small amount of water and the residue then standardized as a paste; or after washing with a small amount of water, the press-cake is washed with acidulated water (e. g., a 1 percent hydrochloric acid solution), then thoroughly with water until free from acid, and dried at a temperature not to exceed 100° C., and preferably at 50°–65° C. Instead of caustic soda, other caustic alkalies, such as caustic potash, may be used.

(b) The residual paste is boiled for about 15 to 30 minutes with a dilute solution of caustic soda, preferably about a 5 percent solution, in an amount sufficient to form polysulfides corresponding in composition from sodium trisulfide to pentasulfide by interaction with the free sulphur present in the cake. The amount of caustic soda required may be based on the following equations:

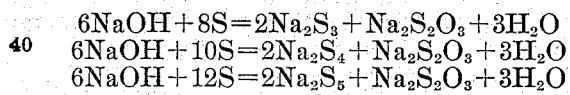

It is then filtered, and washed with water until the dye begins to pass through the filter and then particularly if the press-cake is to be dried, with acidulated water and finally with water alone. A dilute solution of sodium sulfide, e. g., a 3 to 5 percent solution, suffiicent to form the tri-, tetra- or pentasulfide may be used in place of caustic alkali.

In case the dyestuff contains very little or substantially no free sulphur, then the soluble sulphur dyes are preferably removed by treatment with a solution of sodium tri-, tetra- or pentasulfide, or a mixture of these sulfides, instead of with caustic soda or sodium monosulfide, in which the vat dyestuff is substantially insoluble, or difficulty soluble, while the sulphur dye is comparatively readily soluble.

In the above examples, the amount of sodium monosulfide and sulphur employed in the sulphuration, as well as their proportion to each other, may be varied over comparatively wide limits. An excess of sodium sulfide and sulphur does not appear to injure the quality of the dyestuff provided the proportion of sulphur to sodium sulfide is not less than that required by the formula $Na_2S_6$, and it may be as high as $Na_2S_{13}$. The amount of alkali polysulfide employed in the sulphuration should not be less than about four moles to each mole of indophenol. Other sulphurizing agents may be employed, for example, the product resulting from the interaction of caustic alkali and sulphur. The presence of excessive amounts of water is also detrimental, and not more than 20 percent, preferably not more than about 5 to 8 percent, is allowable based on the amount of solvent used.

It is to be understood that the methods of isolation, purification and drying contemplated by the present invention constitute a part of the invention when applied to sulphurized dyestuffs, derived from indophenols, and particularly sulphurized vat dyestuffs derived from the carbazole-indophenol compounds, produced in any well-known and suitable manner such as, for example, when produced in the presence of any suitable solvent, e. g., ordinary alcohol or a suitable denatured alcohol.

In a similar manner, sulphurized dyestuffs, and particularly sulphurized vat dyestuffs, may be prepared, isolated, purified and dried, from other carbazole-indophenols, for example, from indophenols obtainable by the condensation of carbazole, or N-alkyl carbazole such as N-methyl or N-ethylcarbazole, etc., or their nuclear halogenated derivatives on the one hand, with para-nitrosophenol, its homologues, and the halogen derivatives thereof on the other.

In the claims, it will be understood that the term "carbazole-indophenol compound" means and includes the indophenols, or their leuco compounds, which can be derived from carbazole or N-alkyl carbazole, or their nuclear alkylated or halogenated derivatives on the one hand and para-nitrosophenol, its homologues, or halogen derivatives thereof on the other; the term "alkaline agent" means and includes the alkali metal hydroxides and alkali metal sulfides; and the term "alkali metal polysulfide" denotes and includes such sulfides as may be empirically regarded as containing not less than about six sulphur atoms in their formula, for example, $Na_2S_6$, etc.

I claim:

1. In the production of sulphurized vat dyestuffs, the method which comprises subjecting a carbazole-indophenol compound to the action of an alkali metal polysulfide in the presence of alcohol at about the boiling temperature, distilling off the alcohol until a residual paste is obtained, rendering said paste non-alkaline in reaction by the addition of acidulated water and, after filtration and washing with water, subsequently drying the dyestuffs to substantial dryness.

2. In the method according to claim 1, the step which comprises drying the non-alkaline paste to substantial dryness at a temperature not to exceed 100°C.

3. In the method according to claim 1, the step which comprises drying the non-alkaline paste to substantial dryness at a temperature not to exceed about 65°C.

4. In the production of sulphurized vat dyestuffs, the method which comprises boiling a carbazole-indophenol compound free from a halogen substituent with an alkali metal polysulfide in the presence of alcohol, distilling off the alcohol until a residual paste is obtained, separating the vat dyestuff from the soluble impurities by treating the residual paste with a solution of an alkaline agent of such an amount that with the free sulphur present in the paste there is formed a polysulfide whose empirical composition lies between tri- and pentasulfide inclusive, and finally drying the separated and undried vat dyestuff to substantial dryness after making it non-alkaline in reaction by treatment with acidulated water and washing with water until substantially free from soluble matter.

5. In the production of sulphurized vat dyestuffs, the method which comprises boiling N-ethylcarbazole-indophenol with sodium polysulfide in the presence of alcohol, isolating the resulting product as a paste or press-cake, separating the vat dyestuff from impurities by treating the paste or press-cake with a solution of caustic soda of such an amount that substantially all of the free sulphur present in the paste is dissolved to form a polysulfide having an empirical composition between the tri- and pentasulfide inclusive, besides the sodium thiosulfate formed, and finally drying the separated and undried vat dyestuff to substantial dryness after making it non-alkaline in reaction.

6. In the production of sulphurized vat dyestuffs by heating a carbazole-indophenol compound with an alkali metal polysulfide in the presence of a suitable solvent, the method of separating the vat dyestuff from sulphur and other impurities which comprises treating the impure product with a solution of sodium sulfide of such an amount that it is wholly converted into an empirical polysulfied, and filtering off the purified vat dyestuff.

7. In the production of sulphurized vat dyestuffs by inducing a reaction between a carbazole-indophenyl compound and an alkali metal polysulfide in the presence of a suitable solvent and isolating the product, the improvement which comprises making the product non-alkaline in reaction by treatment with acid, and then drying the product.

8. In the method according to claim 7, the step which comprises effecting the drying of the isolated product at a temperature not to exceed 100°C.

9. In the method according to claim 7, the step which comprises effecting the drying of the isolated product at a temperature not to exceed about 65°C.

10. In the production of sulphurized vat dyestuffs by subjecting N-ethylcarbazole-indophenol to the action of an alkali metal polysulfide in the presence of boiling ethyl alcohol, the step which comprises carrying out the reaction for about 65 to 100 hours.

11. In the production of sulphurized vat dyestuffs by subjecting a carbazole-indophenol compound to the action of an alkali metal polysulfide, the improvement which comprises removing free sulphur present from the reaction product by adding an alkaline agent in such an amount that with the free sulphur present in the reaction product there is forced a polysulfide whose empirical composition lies between tri- and pentasulfide inclusive.

12. In the production of sulphurized vat dyestuffs by subjecting a carbazole-indophenol compound to the action of an alkali metal polysulfide, the improvement which comprises removing free sulphur present from the reaction product by adding caustic alkali in such an amount that with the free sulphur present in the reaction product there is formed a polysulfide whose empirical composition lies between tri- and pentasulfide inclusive.

13. In the production if sulphurized vat dyestuffs by subjecting a carbazole-indophenol compound to the action of an alkali metal polysulfide, the improvement which comprises treating the product in the form of a paste with an acid to render the paste non-alkaline in reaction and drying the resulting non-alkaline product.

14. In the production of sulphurized vat dyestuffs by subjecting a carbazole-indophenol compound to the action of an alkali metal polysulfide, the improvement which comprises treating an alkaline re-acting dyestuff with an acid to render it non-alkaline in reaction, washing and drying the resulting non-alkaline product.

15. In the production of sulphurized vat dyestuffs by subjecting a carbazole-indophenol compound to the action of an alkali metal polysulfide in the presence of a solvent, the improvement which comprises treating the product in the form of a paste with an acid to render the paste non-alkaline in reaction, drying the resulting non-alkaline product, and removing free sulphur by treatment with a sufficient amount of an alkaline agent to form a solution of a polysulfide having an empirical composition which ranges from the tri- to the pentasulfide inclusive.

16. In the production of sulphurized vat dyestuffs by subjecting a carbazole-indophenol compound to the action of an alkali metal polysulfide in the presence of a suitable solvent, the improvement which comprises distilling off the solvent at the end of the reaction until a residual paste is obtained, treating the residual paste with a solution of an alkaline agent in such an amount that with the free sulphur present in the paste there is formed a polysulfide having an empirical composition ranging from tri- to pentasulfide inclusive, treating the resulting product with acid to render it non-alkaline in reaction, and drying the non-alkaline product.

17. In the production of sulphurized vat dyestuffs by subjecting a carbazole-indophenol compound to the action of an alkali metal polysulfide in the presence of a suitable solvent, the improvements which comprise distilling off the solvent until a residual paste is obtained, and separating the vat dyestuffs from the soluble impurities by treating the residual paste with a solution of an alkaline agent of such amount that with the free sulphur present in the paste there is formed a polysulfide having an empirical composition ranging from tri- to pentasulfide inclusive.

18. In the production of sulphurized vat dyestuffs by subjecting a carbazole-indophenol compound to the action of an alkali metal polysulfide in the presence of a solvent the improvements which comprise distilling off the solvent until a residual paste is obtained, and separating the vat dyestuffs from the soluble impurities by treating the residual paste with a solution of caustic alkali of such amount that with the free sulphur present in the paste there is formed a polysulfide having an empirical composition ranging from tri- to pentasulfide inclusive.

19. In the production of sulphurized vat dyestuffs by subjecting a carbazole-indophenol compound to the action of an alkali metal polysulfide in the presence of a solvent, the improvements which comprise distilling off the solvent until a residual paste is obtained, separting the vat dyestuffs from the soluble impurities by treating the residual paste with a solution of an alkaline agent of such amount that with the free sulphur present in the paste there is formed a polysulfide having an empirical composition ranging from tri- to pentasulfide inclusive, rendering the vat dyestuffs non-alkaline in reaction, and drying to substantial dryness.

20. In the manufacture of a sulphurized dyestuff by inducing a reaction between a carbazole-indophenol compound and a sulphurizing agent, a process which comprises rendering the dyestuff non-alkaline in reaction before it is dried.

21. In the manufacture of a sulphurized vat dyestuff by inducing a reaction between a carbazole-indophenol compound and a sulphurizing agent, a process which comprises separating a soluble sulphurized dyestuff from the sulphurized vat dyestuff by treating the latter containing the former with a solution of an alkali metal polysulfide having an empirical composition ranging from the tri- to the pentasulfide inclusive.

22. In the manufacture of a sulphurized vat dyestuff by inducing a reaction between a carbazole-indophenol compound and a sulphurizing agent, a process which comprises rendering the dyestuff non-alkaline in reaction and then drying it.

23. In the manufacture of a sulphurized vat dyestuff by inducing a reaction between a carbazole-indophenol compound and a sulphurizing agent, a process which comprises separating a soluble sulphurized dyestuff from the sulphurized vat dyestuff by means of a solution of an alkali metal polysulfide whose empirical composition is greater than the disulfide.

24. A composition comprising a product obtainable by the process of claim 20.

25. A composition comprising a product obtainable by the process of claim 22.

26. A composition comprising a product obtainable by the process of claim 7.

27. A composition comprising a product obtainable by the process of claim 19.

28. In the manufacture of a sulphurized vat dyestuff by inducing a reaction between ethyl-carbazole-indophenol and a sulphurizing agent, a process which comprises rendering non-alkaline the undried dyestuff and then drying it.

29. A composition comprising a product obtainable by the process of claim 28.

30. In the production of sulphurized vat dyestuffs, the process which comprises boiling an N-ethylcarbazole-indophenol for about 65 to 100 hours with sodium polysulfide in the presence of ethyl alcohol denatured by the addition of benzene.

31. In the production of sulphurized vat dyestuffs, the process which comprises boiling N-ethylcarbazole-indophenol for about 70 to 90 hours, with sodium polysulfide in the presence of ethyl alcohol denatured by the addition of benzene.

In testimony whereof I affix my signature.

RAY W. HESS.